Feb. 18, 1969   J. STRANGE   3,428,344
FASTENING DEVICE
Filed Sept. 27, 1966

INVENTOR.
JOHN STRANGE
BY
Jeare, Jeare & Sammon
ATTORNEYS

United States Patent Office 3,428,344
Patented Feb. 18, 1969

1

3,428,344
FASTENING DEVICE
John Strange, Llanishen, Wales, assignor to Tinnerman Products, Inc., Cleveland, Ohio, a corporation of Ohio
Filed Sept. 27, 1966, Ser. No. 582,349
Claims priority, application Great Britain, Dec. 1, 1965,
51,065/65
U.S. Cl. 287—53                       4 Claims
Int. Cl. F16d 1/08; F16b 21/09

ABSTRACT OF THE DISCLOSURE

A fastener for connecting a rotatable member to a shaft. The device comprises a spring-like body of loop-like shape to provide resilient circumferential expansion and contraction. One end of the body is provided with a recess; the other with a complementary projection to be received in the recess for adjustably holding the body closed. An integral tongue which projects inwardly is disposed between the projection and recess to spring-bias the rotatable member to the shaft.

---

The present invention relates to means for connecting a rotatable member to a shaft, rod, spindle or the like herein referred to generically as a shaft. More particularly, but not exclusively, the invention relates to means for connecting the integral hub of a knob—for example, one of the control knobs of a radio set—to its corresponding control shaft.

Heretofore, it has been known to provide means for connecting a rotatable member to a shaft, comprising a spring collar of cylindrical or part-cylindrical form and an integral tongue projecting inwardly from the collar, the collar being adapted to fit at least half-way round a corresponding cylindrical periphery of the rotatable member with the tongue extending inwardly along a plane containing the axis of the rotatable member but terminating short of the said axis. The tongue projects inwardly from one end of the collar and to give a greater grip on the shaft, the other end of the collar may overlap the tongue.

It is found in practice that, to provide sufficient grip on the shaft, it is preferable to impart additional spring bias to the tongue by using an overlapping design. However, use of such design, in for example, connecting the control knob of a radio set to its corresponding control shaft may necessitate inconvenient cabinet or moulding changes due principally to the double collar thickness in the overlapping region. The present invention seeks to avoid such inconvenience by providing connecting means which gives a constant grip between a rotatable member and a shaft while taking into account the tolerance of both member and shaft, are also capable of giving an increased grip on the shaft without involving an overlap.

Summary of the invention

This invention provides means for connecting a rotatable member to a shaft, comprising a spring collar of cylindrical or part-cylindrical form and an integral tongue projecting inwardly from a region intermediate the ends of the collar, the collar being adapted to fit at least half-way round a corresponding cylindrical periphery of the rotatable member with the tongue extending inwardly along a plane containing the axis of the rotatable member but terminating short of the said axis.

Preferably, the collar is adapted to fit around substantially the whole periphery of the rotatable member, and to ensure good retention of the collar on the member a claw may with advantage be incorporated in the collar; to avoid interfering with the spring action of the tongue, this claw may conveniently be located intermediate the ends of the collar at a region diametrically opposite the tongue. Alternatively a sharply-defined dimple may be used to achieve the same purpose. The tongue may have an inclined leading edge to facilitate entry of the shaft into the bore of the rotatable member.

The connecting means may incorporate a rotatable member, such as the integral hub of a control knob or the like, which is particularly simple in design and easy to mold. The present invention then further comprises the said spring collar in combination with a rotatable member having a cylindrical outer periphery, an axial bore with a flat, and a radial slot extending between the bore and the cylindrical periphery of the member, the collar being fitted around the rotatable member with the tongue projecting through the slot in the bore so as to be adapted to bear against a co-operating shaft with a corresponding flat and connect the shaft to the member for rotation therewith.

In order that the invention may be clearly understood, a preferred embodiment thereof will now be described by way of example only, with reference to the accompanying drawings in which:

Brief description of the drawing

Referring now to FIGURE 1, the spring collar is made from a blank 1 cut from a strip of spring metal, such as steel, one end of the blank having a projection 2 and the other end having a corresponding recess 3. Since the projection 2 and recess 3 are complementary, a large number of such blanks can be cut from a single strip without waste of material. Intermediate the ends of the collar, in a region relatively near the projection 2, there is formed a slot 4 which is generally rectangular in shape but has its upper edge 5, as viewed in FIGURE 1, tapering gently downwardly from the sides of the slot. Cuts 6 extend upwardly from the sides, and tongue 7 of the spring collar (FIGURES 2 and 3) is made by bending the material between cuts 6 at right angles to the plane of the blank; edge 5 then forms the end of the tongue and its shape ensures that there is always an inclined leading edge presented to a co-operating shaft, as further described below. It will be seen from FIGURE 1 that a further slot 8, which is substantially V-shaped, is located intermediate the ends of the collar near the recess 3. In making the collar from the blank, the material 9 between the arms of the V-shaped slot 8 is turned up out of the plane of the blank to form a claw.

Referring now to FIGURES 2 and 3, which show the fully formed collar, it will be seen that the blank 1 is formed into a cylinder 10 which is almost, but not quite, closed since the extremity of projection 2 enters the mouth of corresponding recess 3 at the other end of the metal blank. This permits resilient expansion and contraction of the collar, while the configuration of the ends of the collar prevents a number of such collars in a supply box from becoming entangled one with another. The tongue 7 extends inwardly along a plane containing the axis of the cylindrical collar, and therefore also the axis of the rotatable member on which the collar is to be used, but terminating short of this axis. Opposite the tongue 7, the point of claw 9 extends angularly inward so as to engage the rotatable member and bias the collar against withdrawal therefrom.

FIGURES 4 and 5 show a suitable rotatable member comprising the hub 11 of a control knob molded from polymeric material, such as plastic. The hub 11 has a recessed end portion 12 having a cylindrical outer periphery and an axial bore 13 with a flat 14. A slot 15 with a widened mouth 16 extends axially inward from the extremity of recessed end portion 12 of the hub, the slot being radially disposed between the cylindrical periphery of portion 12 and the region of bore 13 opposite flat 14. The sizes of bore 13 and flat 14 in the hub 11 of the control knob may be determined by the dimensions of the co-operating shaft 17, shown in FIGURES 6 and 7 with its corresponding flat 18, but the need for close tolerances is obviated by the provision of the tongue 7 which is constantly biassed into engagement with shaft 17 when the collar is fitted around portion 12 of hub 11 with tongue 7 projecting through slot 15 and the shaft 17 is inserted into the bore 13 of the hub.

Figure 1:
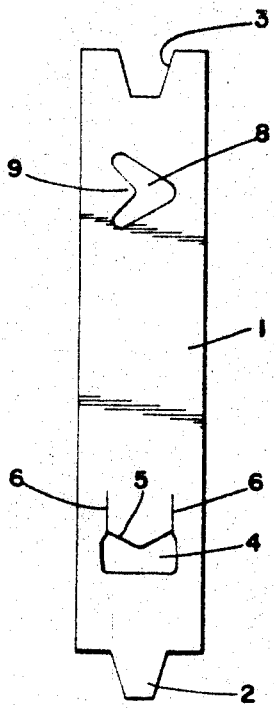
FIGURE 1 is a plan view of the blank from which the spring collar is made.
Figure 2:
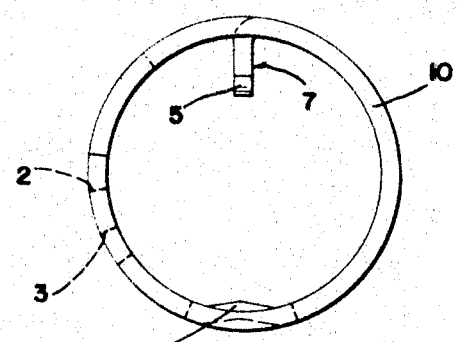
FIGURE 2 is an enlarged end view of the fully formed spring collar.
Figure 3:
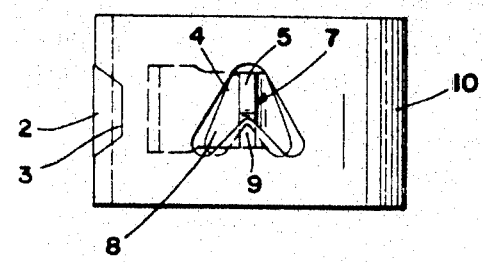
FIGURE 3 is an enlarged side elevational view of the fully formed spring collar.
Figure 4:
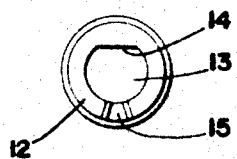
FIGURE 4 is a fragmentary side view, but on a reduced scale showing a portion of a hub of a control knob and which the spring collar may be used for the purpose of connecting a shaft to the knob.
Figure 6:
FIGURE 6 is a fragmentary side view showing a co-operating end of a shaft to which the control knob may be applied.
Figure 5:
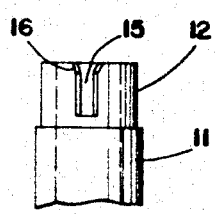
FIGURE 5 is a top plan view of the control knob of FIGURE 4.
Figure 7:
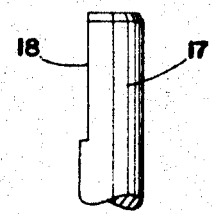
FIGURE 7 is a top plan view of the shaft of FIGURE 6.

It will be understood that the spring collar described above may be modified in several respects without departing from the scope of the invention. The collar must fit at least halfway round the cylindrical periphery of the rotatable member or hub in order to ensure that the hub is gripped by the collar, and it is preferred that the collar should fit round substantially the whole of the hub periphery. This latter design makes it possible to incorporate the claw 9 disposed opposite the tongue 7, providing excellent retention of the collar on the hub without interfering with the spring action of the tongue. In a modification, the position of the claw may be at right angles to that shown in the drawings so that the collar is axially symmetrical and may be placed on the hub from either side. When the collar is fitted round the hub, with the tongue 7 in the slot 15, the tongue should extend inwardly along a plane containing the axis of the hub but terminating short of this axis. At the same time, the tongue should be long enough to protrude out of the slot 15 into the hub bore 13 to an extent sufficient to ensure effective engagement with the curved periphery of shaft 17. As the shaft is inserted in the hub bore, the tongue 7 is deflected outwardly so as to exert a spring-bias urging the flats 14 and 18 of the hub and shaft respectively into engagement and prevent backlash between hub and shaft. While it is preferable that the shaft should fit fairly tightly within the hub bore, the connecting means of the present invention will ensure that the hub is firmly secured to the shaft even if the tolerances are such as to allow the shaft to fit comparatively loosely within a particular hub.

I claim:
1. A fastening device adapted to be disposed in engaged relation around a rotatable member for connecting the rotatable member to a shaft member, the rotatable member including a generally cylindrical outer peripheral configuration with an axial bore extending therethrough adapted to receive said shaft member therein, and said rotatable member having a flat portion adapted for engagement with a complementary configured portion on said shaft member, and a radial slot extending between the outer periphery of said rotatable member and a portion of said bore generally opposite said flat portion, and device comprising a spring-like body formed into a looplike configuration to provide resilient expansion and contraction thereof generally circumferentially and adapted for attachment around said rotatable member, one end of said body being provided with a recess, and the other end of said body being provided with a projection configured for complementary receipt in said recess adapted for retaining the opposite ends of said body in circumferential aligned relation and in generally closed relation around said rotatable member, said body being provided with an integral tongue means projecting inwardly therefrom along a plane containing the axis of said body and terminating short of said axis and being disposed between said projection and said recess, said body being adapted to be disposed in resilient engagement around the periphery of said rotatable member with said tongue means projecting through said slot for resiliently biasing said flat portion of said bore into engagement with the corresponding portion of said shaft member for connecting the shaft member to said rotatable member for unitary rotation of said members, including a claw member struck from the material of said body and extending inwardly and upwardly from said body, and wherein said claw member is disposed between said recess and said projection and generally opposite said tongue means having springlike characteristics for biasing said tongue means into tight engagement with said shaft member.

2. A fastening device in accordance with claim 1, wherein said tongue means comprises a tongue struck from the material of said body and bent inwardly from said body, and said tongue includes at least one inclined leading edge at the inner end of said tongue.

3. A fastening device in accordance with claim 1, wherein said claw member includes a generally V-shaped slot struck from the material of said body, the material between the arms of said slot defining said claw member.

4. A fastening device in accordance with claim 3, wherein said body includes a pair of oppositely disposed side edges and wherein said claw extends upwardly and outwardly in a general direction toward one of said side edges.

References Cited

UNITED STATES PATENTS 2,475,772   7/1949   Allen _____ 29—483

FOREIGN PATENTS 701,014   12/1953   Great Britain.
1,414,827   9/1965   France.

CARL W. TOMLIN, *Primary Examiner.*

A. V. KUNDRAT, *Assistant Examiner.*

U.S. Cl. X.R.

85—8.8; 16—121